Patented Aug. 7, 1945

2,381,052

UNITED STATES PATENT OFFICE 2,381,052

GLYCEROL FERMENTATION PROCESS

Howard M. Hodge, Linthicum Heights, Md., assignor, by mesne assignments, to U. S. Industrial Chemicals, Inc., a corporation of Delaware No Drawing. Application February 13, 1940,
Serial No. 318,705

6 Claims. (Cl. 195—38)

It is well established that sulfites, bisulfites, alkaline carbonates, molasses ash and other alkaline materials, when added to a yeast fermenting sugar solution so as to produce an alkaline mash, increase the yield of glycerol above that obtained in the normal alcoholic fermentation.

It is also generally conceded that it is desirable to employ relatively cheap sources of sugar, such as molasses, if fermentation glycerol is to compete with glycerol obtained by other processes.

A disadvantage inherent in the majority of previously described glycerol fermentation processes is the large amount of salts or alkalies required to obtain a commercially valuable glycerol yield. If, for example, a mash containing 100 tons of sugar were fermented by the soda ash process of Eoff, or the sulfite process of Connstein and Lüdecke, over 30 tons of salts would have to be added to the fermenter. If the molasses-ash process as described by Lawrie were used, over 50 tons of molasses ash would be required. The use of such large quantities adds so materially to the costs and difficulties of these processes as to render them impractical.

In general, previously described glycerol fermentation processes have called for an alkaline reacting mash. The use of an alkaline mash greatly increases the infection hazard—an item of considerable importance in plant operation. If the usual practice is followed and highly alkaline materials are added at intervals to the mash, yeast activity is stopped upon each addition. Usually it takes from two to three hours after each addition for the yeast to recover. During these periods, there is an excellent opportunity for contaminating organisms to develop. Furthermore, this sharp interference with the normal yeast activity makes the fermentation precarious and thus requires close control. It would, therefore, be a distinct advantage to utilize an acid medium for glycerol production and especially advantageous if a continuous, uninterrupted fermentation were to ensue.

Glycerol production above about 3%–4% of the sugar fermented in an acid medium, except for a proposal involving a large quantity of neutral salts, has never been anticipated. Connstein and Lüdecke in U. S. Patent No. 1,511,754, page 1, lines 52–57, state: "If one causes, as hitherto usual, sugar or starch to ferment in neutral or acid solution only small amounts of propantriol are formed, whereas acids are formed which injure the isolation of the small amounts of propantriol obtained." In a similar vein, Lawrie in his monograph, "Glycerol and the glycols," states on page 130, line 6: "Normally—i. e., at pH 6.8 to say pH 3.5, 91% to 94% of the sugar fermented undergoes the usual Gay-Lussac reaction, while glycerol is formed to an amount representing 3% to 4.5% of the sugar."

It has now been found that glycerol is formed in greatly increased amounts by yeast in fermenting solutions if the pH is maintained between pH 6.0 and pH 7.0, and preferably between pH 6.4 and pH 7.0, in the presence of ammonium compounds in an amount considerably above that required for nutrition of the yeast. It becomes unnecessary to maintain the pH on the alkaline side and furthermore a small concentration of ammonium ions suffices for the function of this agency in the desired increase in glycerol.

As sources of ammonium ions or ammonium compounds in the mash, ammonia gas, aqua ammonia, and in general the ammonium salts that are non-toxic to yeast (ammonium chloride, ammonium sulfate, ammonium phosphate, ammonium carbonate, for example) are suitable, and one or more of these agents may be employed. The quantity of such material should be limited; otherwise there is likelihood of diminished glycerol formation or even of failure of the fermentation. On the other hand, the amount of ammonia or its equivalent added to the mash is in excess of that which would be adequate solely for yeast-nutrition in a commercial fermentation. To keep the fermenting mash solution within the stated pH range any non-nitrogenous neutralizer, non-toxic to yeast, for example, lime, may be used. The additions of ammonia, gaseous or aqueous, or ammonium salts, one or more, are to be within such amounts that the ammonia equivalent is between 0.1% and 1.0%, and preferably between 0.2% and 0.5%, by weight of the mash. If 30% aqua ammonia is used the optimum amount thereof is approximately 1.0% by volume of the mash, the $NH_3$ equivalent being 0.3%. Since the amounts of ammonia or its equivalent and lime or its equivalent are small, the disadvantage of loading the fermentation with large amounts of salts is overcome.

In carrying out this fermentation it is advantageous, though not absolutely essential, to employ the two-stage glycerol operation described by F. M. Hildebrandt and N. M. Erb in U. S. Patent No. 2,169,245, dated August 15, 1939.

In general outline, the preferred mode of carrying out the instant invention is as follows:

A yeast crop is grown by aeration in a dilute sugar mash, preferably a still residue from a previous ethanol or glycerol fermentation. After a good yeast crop has developed (12-24 hours), molasses is added to raise the sugar content of the mash to 15-20 grams per 100 cc. Fermentation sets in promptly, and then sufficient aqua ammonia is added to bring the pH of the mash to 6.5-6.8. As the fermentation continues, hydrated lime is added when necessary to maintain the pH of the mash between 6.0 and 7.0.

Although the ammonium salts may be used, it is preferable to use aqua ammonia. The aqua ammonia or its equivalent as used in this fermentation supplies ammonium ions or ammonium compounds for increased glycerol production. The small amount used has a stimulating action in the fermentation, and thus enables one to employ a higher sugar concentration than would otherwise be permissible. Since the fermented-out mash is already acid, it is necessary, before distilling off the ethanol, only to acidify it slightly to pH 6.0 if it has not reached this point. At pH 6.0 the ammonia is non-volatile during the distillation and does not contaminate the alcohol distillate.

Any neutralizer other than lime that is non-toxic to yeast may be employed to keep the fermenting mash at the desired pH, examples being dolomitic lime, soda ash, alkaline oxides and hydroxides such as those of sodium and potassium, and alkaline carbonates such as the carbonates of potassium and sodium. Lime is preferred because of its strength as a neutralizer, its cheapness and availability. When lime is used its solubility is increased by the ammonia or ammonium salts.

The following examples illustrate the invention:

(#1) 550 gallons of still residue from a previous ethanol fermentation were put into a clean fermenter, cooled to 90° F., and 2 lbs. of ammonium sulfate were added as a yeast nutrient. The mash was then inoculated with 2 gallons of active yeast culture and aerated for 17 hours. Microscopic examination at this time showed that a good yeast crop had developed. 166 gallons of molasses were then added over a period of two hours to give a sugar concentration of 20.25 grams per 100 cc. Aeration was then discontinued and fermentation started immediately. 5 gallons of 30% aqua ammonia were then added, which changed the mash from pH 5.80 to 6.80. After 26½ hours 5 lbs. of freshly slaked lime in three gallons of water were added, raising the pH from 6.49 to 6.70. At 30½ hours a second quantity of 5 lbs. of lime was added, changing the pH from 6.46 to 6.66. At 31½ hours a third dose of 5 lbs. of lime was added which brought the pH from 6.50 to 6.70. The fermentation was then allowed to go to completion with no further additions, fermentation being complete at 70 hours at pH 6.07. Analysis showed 2.66 grams of glycerol and 6.99 grams of ethanol per 100 cc. The lime used amounted to 1.25% of the sugar contained in the molasses used.

2) A yeast crop was grown in 525 gallons of still residue by aeration as described in Example #1. After 18 hours aeration 179 gallons of molasses were added over a period of 2½ hours to give a sugar concentration of 20.51 grams per 100 cc. Aeration was discontinued and 7 gallons of 30% aqua ammonia were then added, raising the pH from 5.6 to 6.66. At 22, 24, 29 and 35 hours separate doses each of 5 lbs. of freshly slaked lime in 3 gallons of water were added to maintain the pH of the mash between 6.60 and 6.90. Fermentation was then allowed to go to completion with no further additions and was complete at 69 hours at pH 6.48. Analysis of the beer showed 3.38 grams of glycerol and 7.03 grams of ethanol per 100 cc. The lime used amounted to 1.66% on the sugar basis.

It is not necessary to perform this fermentation in two stages, as the following example will show. However, if the two-stage process is not used, the mash should be pasteurized in order to get the best results. This adds to the cost of operation.

(#3) A mash consisting of 350 gallons of still residue from a previous ethanol fermentation, 175 gallons of molasses, and 202 gallons of water, was pasteurized, cooled and seeded with 2 gallons of active yeast culture. This mash contained 20.00 grams of sugar per 100 cc. After 18 hours, fermentation was vigorous and 7 gallons of aqua ammonia were added, changing the pH from 5.70 to 6.75. At 26 and 37 hours 5 lbs. of freshly slaked lime in 3 gallons of water were added, maintaining the pH of the mash between 6.51 and 6.90. The mash was then allowed to ferment out with no further additions and was complete at 89 hours at pH 6.44. The beer contained 3.42 grams of glycerol and 5.96 grams of ethanol per 100 cc. The lime used amounted to .84% of the total sugar.

To illustrate the use of an ammonium salt in place of ammonia and a non-nitrogenous neutralizer other than lime, the following is given:

(#4) 800 cc. quantity of still residue from a previous ethanol fermentation of molasses was inoculated with 5 cc. of an active yeast culture and aerated for 16 hours. At this time a large number of active yeast cells had developed, and 300 grams of blackstrap molasses was added, giving a sugar concentration of 17 grams per 100 cc. To this mash of 1 liter volume there were added 5 grams of technical ammonium chlorid as a source of ammonium ions. Fermentation set in promptly and 10 grams of soda ash were added, changing the pH of the mesh from 5.8 to 6.8. At 23 hours 5 grams of soda ash were added and at 30 hours 3 grams to keep the pH between 6.5 and 6.9. The mash was then allowed to ferment out with no further additions and was complete after 5 days at pH 6.35. Analysis showed 2.66 grams of glycerol and 5.38 grams of ethanol per 100 cc. of beer. The soda ash used amounted to 10.6% of the total sugar.

While it is preferable to employ non-nitrogenous neutralizers in maintaining the critical pH range, this is not absolutely essential, since fair glycerine yields can be obtained under the invention by using a non-toxic alkaline ammonium compound, in sufficient quantities, both as a source of ammonium ions and as a neutralizer to substantially keep the pH within the values stated. This may be accomplished, for example, by the addition, or additions, of ammonium carbonate in total amount approximating 10% on the sugar basis, without the addition, also, of a non-nitrogenous neutralizer.

Since the still residue obtained after distillation of the beer to remove the alcohol obtained in the herein described glycerol fermentation process is acid, and contains no toxic salts, it may be used to "slop back" in a second glycerol fermentation. When diluted with water the glycerol still residue may be used as a medium to grow the yeast required for a second glycerol fermentation. In this way part of the residual sugar from the first fermentation can be utilized, a saving in evaporating costs realized, and the glycerol carried over from the first fermentation is added to that formed in the second fermentation. In this manner the glycerol content of the beer can be gradually increased to a higher level by "slopping back" of glycerol-containing still residue. For example, 1500 cc. amount of still residue from a glycerol fermentation made by the process here described and containing 3.04 grams of glycerol per 100 cc. was diluted with water to 3000 cc., inoculated with 10 cc. of active yeast culture and aerated for 16 hours. Microscopic examination at this time showed the presence of a large number of yeast cells. Sufficient blackstrap molasses was then added to give a sugar concentration of 19 grams per 100 cc. Fermentation set in promptly and 1% of the mash volume (38 cc.) of aqua ammonia was added, bringing the pH of the mash from 5.80 to 6.80. Small amounts of freshly slaked lime were then added at intervals to maintain the pH of the mash between 6.4 and 6.9. Analysis after 5 days showed 4.48 grams of glycerol and 5.85 grams of ethanol per 100 cc.

Whether the process is worked as a one-stage or a two-stage operation, the control of the pH of the mash is essential. Experience indicates that the optimum range is pH 6.4–pH 7.0.

From the foregoing it will be evident that this new process for glycerol fermentation has certain unique and desirable advantages. Thus, the fermentation is carried out in an acid mash, whereby the infection hazard is greatly reduced. The glycerol promoting agents—ammonia or ammonium salts and lime or the like—are required in low concentrations. Because of the small amounts of neutralizers required, the yeast cells are not subjected to drastic changes in pH, fermentation is not arrested upon each addition and a continuous uninterrupted fermentation ensues. The glycerol content of the beer can be increased to a higher level by slopping back of the non-toxic glycerol-bearing still residue.

I claim:

1. Process for carrying out uninterrupted yeast fermentation of sugar solutions, which is characterized by addition of material of the group consisting of ammonia and ammonium salts non-toxic to yeast in amount sufficiently in excess of the nutrient requirements of the yeast to promote the formation of glycerol, and maintenance of the pH of the fermentation solution between pH 6 and pH 7 by addition of one or more non-toxic neutralizers.

2. Process for carrying out uninterrupted yeast fermentation of sugar solutions, which is characterized by addition of material of the group consisting of ammonia and ammonium salts non-toxic to yeast in amount sufficiently in excess of the nutrient requirements of the yeast to promote the formation of glycerol, the amount added of such material being equivalent to 0.1%–1.0% $NH_3$, and maintenance of the pH of the fermentation solution between pH 6 and pH 7 by addition of one or more non-nitrogenous non-toxic neutralizers.

3. Process for carrying out uninterrupted yeast fermentation of sugar solutions, which is characterized by addition of material of the group consisting of ammonia and ammonium salts non-toxic to yeast in amount sufficiently in excess of the nutrient requirements of the yeast to promote the formation of glycerol, and maintenance of the pH of the fermentation solution between pH 6 and pH 7 by addition of lime.

4. Process for carrying out uninterrupted yeast fermentation of sugar solutions, which is characterized by addition of aqua ammonia in such amount that the $NH_3$ equivalent thereof is between 0.1% and 1.0% by weight of the mash, to promote the formation of glycerol, and maintenance of the pH of the fermentation solution between pH 6 and pH 7 by addition of lime.

5. A glycerol fermentation process, which comprises growing a yeast crop in a low sugar mash with aeration, greatly increasing the sugar concentration of the mash and discontinuing aeration, adding material of the group consisting of ammonia and ammonium salts non-toxic to yeast in amount sufficiently in excess of the nutrient requirements of the yeast to promote the formation of glycerol, and maintaining the pH of the fermentation solution between pH 6 and pH 7 by addition of one or more non-toxic neutralizers.

6. The process as characterized in claim 5 in which the low-sugar yeast growing mash comprises still residue from a previous yeast fermentation.

HOWARD M. HODGE.